(12) United States Patent
Cheng et al.

(10) Patent No.: US 7,768,461 B2
(45) Date of Patent: *Aug. 3, 2010

(54) ANTENNA DEVICE WITH INSERT-MOLDED ANTENNA PATTERN

(75) Inventors: Yu-Chiang Cheng, Taipei (TW); Ping-Cheng Chang, Chaozhou Town (TW); Cheng-Zing Chou, Xinying (TW)

(73) Assignee: Getac Technology Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/878,667

(22) Filed: Jul. 26, 2007

(65) Prior Publication Data

US 2008/0018551 A1 Jan. 24, 2008

Related U.S. Application Data

(63) Continuation-in-part of application No. 11/404,814, filed on Apr. 17, 2006.

(51) Int. Cl.
*H01Q 1/24* (2006.01)
*H01Q 1/40* (2006.01)
(52) U.S. Cl. ................. 343/702; 343/873; 343/700 MS
(58) Field of Classification Search ....................... None
See application file for complete search history.

(56) References Cited

U.S. PATENT DOCUMENTS

| 7,339,533 | B2 * | 3/2008 | Kurashima et al. | ........... 343/702 |
| 2002/0075186 | A1 * | 6/2002 | Hamada et al. | ....... 343/700 MS |
| 2002/0089456 | A1 * | 7/2002 | Hamada | ..................... 343/702 |
| 2003/0181227 | A1 | 9/2003 | Toshiyuki | |
| 2004/0051670 | A1 | 3/2004 | Sato | |
| 2005/0001767 | A1 | 1/2005 | Wullf et al. | |
| 2005/0093752 | A1 | 5/2005 | Cheng et al. | |
| 2005/0146475 | A1 | 7/2005 | Bettner et al. | |
| 2007/0216582 | A1 * | 9/2007 | Cheng et al. | ................. 343/702 |

FOREIGN PATENT DOCUMENTS

JP  58087818 A  5/1983

OTHER PUBLICATIONS

Y.Q. Wang et al, "Polymer Modification by Ion Implantation: Electrical Conductivity and Applications," Desk Reference of Functional Polymers Syntheses and Applications, American Chemical Society, pp. 387-404, Washington DC,1997.
Y.Q. Wang et al, "Polymer Modification by Ion Implantation: Ion Bombardment and Characterization," Desk Reference of Functional Polymers Syntheses and Applications, American Chemical Society, pp. 371-385, Washington DC,1997.
Ryan E. Griedd et al, "Electrical and Optical Behavior of Ion-Implanted and Ion-Beam Mixed Polymers," SPIE vol. 3413, pp. 27-36, Quebec, Canada, Jul. 1998.
Y.Q. Wang et al, "Ion Beam Modification and Analysis of Metal/Polymer bi-layer thin films," Nuclear Instruments and Methods in Physics Reasearch, B 219-220, pp. 798-803, 2004 Elsevier B.V.

* cited by examiner

*Primary Examiner*—Trinh V Dinh
(74) *Attorney, Agent, or Firm*—Quintero Law Office

(57) ABSTRACT

Disclosed is an antenna device for transceiving a wireless signal with an insert-molded antenna pattern embedded inside a casing of an electronic device. The insert-molded antenna pattern is connected to an antenna module of a motherboard of the electronic device in order to feed the wireless signal transceived by the insert-molded antenna pattern through an antenna signal feeding line connected to the insert-molded antenna pattern and the antenna module, or by an antenna coupling element coupled with the insert-molded antenna pattern.

6 Claims, 15 Drawing Sheets

ANTENNA DEVICE WITH INSERT-MOLDED ANTENNA PATTERN

CROSS-REFERENCES TO RELATED APPLICATIONS

This application is a continuation-in-part of Ser. No. 11/404,814 filed on Apr. 17, 2006, entitled "Antenna Device with Ion-implanted Antenna Pattern".

FIELD OF THE INVENTION

The present invention relates to an antenna device used in wireless technology, and in particular to an antenna device with insert-molded antenna pattern for an electronic device.

BACKGROUND OF THE INVENTION

It is well known that an antenna is the key element to transmit/receive (transceive) microwaves in wireless technology such as wireless communication and wireless data transfer, where the antenna transforms electrical currents generated by a transmitter into microwaves and transmits the microwaves in free space. The antenna also captures microwaves and transforms them into electrical currents, which are then processed by a receiver. As a result, the characteristics of the antenna deeply affect that of the wireless technology, and the antenna can be referred as the index to examine the quality of the wireless technology.

Among numerous kinds of electronic devices utilizing wireless signal transceiving, the making and the dimension of the antennas used by such devices are not entirely the same. The use of the appropriate antenna not only matches the features of the electronic devices and enhances the quality of the transceiving of a wireless signal, but also reduces the cost of manufacturing the electronic devices.

As shown in FIG. 1, it shows the conventional arrangement of the antenna used in an electronic device. The electronic device, which is generally denoted a numeral reference 1, includes a casing 11, a backlight module 12, an EMI shielding plate or anti-Electromagnetic Interference (anti-EMI) plate 13, and a second casing 14. An antenna 15, which is electrically connected to an antenna module 171 of an motherboard 17 of the electronic device 1 by an antenna signal feeding line 16, is arranged on the inner surface of the second casing 14, and such electrical connection involves the conducting of a wireless signal from the antenna module 171 to the antenna 15 and vice versa.

Further, besides a direct wire connection between the antenna module and the antenna by the antenna signal feeding line as shown in FIG. 1, the method of coupling feeding, which the antenna signal feeding line is electrically connected to an antenna coupling element but not to the antenna and the transceiving of signals between the antenna module and the antenna is by the coupling of the antenna coupling element and the antenna, is also feasible.

Antennas such as dipole antennas, plate antennas, or PIFA antennas used in electronic devices for transceiving wireless signals of conventional use are usually a separate antenna device mounted on a base or a casing of the electronic devices. Although some of the conventionally used antennas in the market are arranged at a predetermined position inside the electronic device, they are in fact individually manufactured and then arranged in and electronically connected to the electronic devices. Such manufacturing is not only troublesome bust also increases costs.

SUMMARY OF THE INVENTION

A primary object of the present invention, therefore, is to provide an antenna device with a simple structure directly embedded inside the casing of the electronic device. Besides, another object of the present invention is to provide an antenna device applying an insert-molding process, and a further object of the present invention is to provide an antenna device embedded with the casing of the electronic device.

To realize the above objects, the present invention installs an antenna device for transceiving a wireless signal with an insert-molded antenna pattern directly embedded inside a casing of an electronic device by applying the process of the insert-molding approach. The insert-molded antenna pattern is connected to an antenna module of a motherboard of the electronic device in order to feed the wireless signal transceived by the insert-molded antenna pattern, while the connection could be either by an antenna signal feeding line directly connected to the insert-molded antenna pattern and the antenna module, or by an antenna coupling element coupled with the insert-molded antenna pattern and connected to an antenna signal feeding line.

In comparison with the conventional technologies, which the antennas are in fact individually manufactured and then arranged in the electronic devices, the present invention directly mounts an antenna pattern inside the structure of an electronic device by applying insert-molding process. Further, the present invention can be adapted into a wide range of electronic devices when used in different fields of application.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
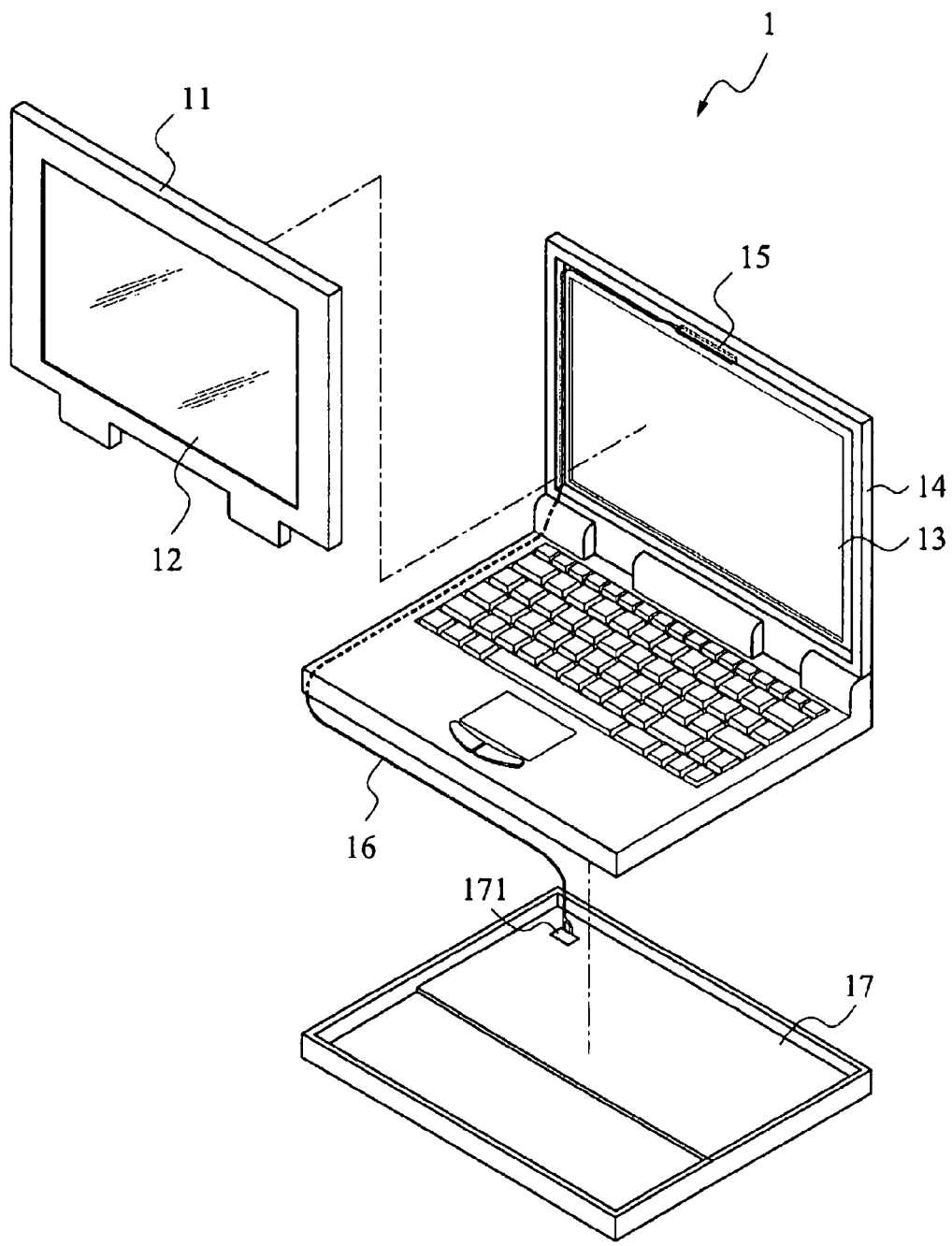
FIG. 1 is an exploded perspective view of the conventional arrangement of the antenna used in an electronic device.
Figure 2:
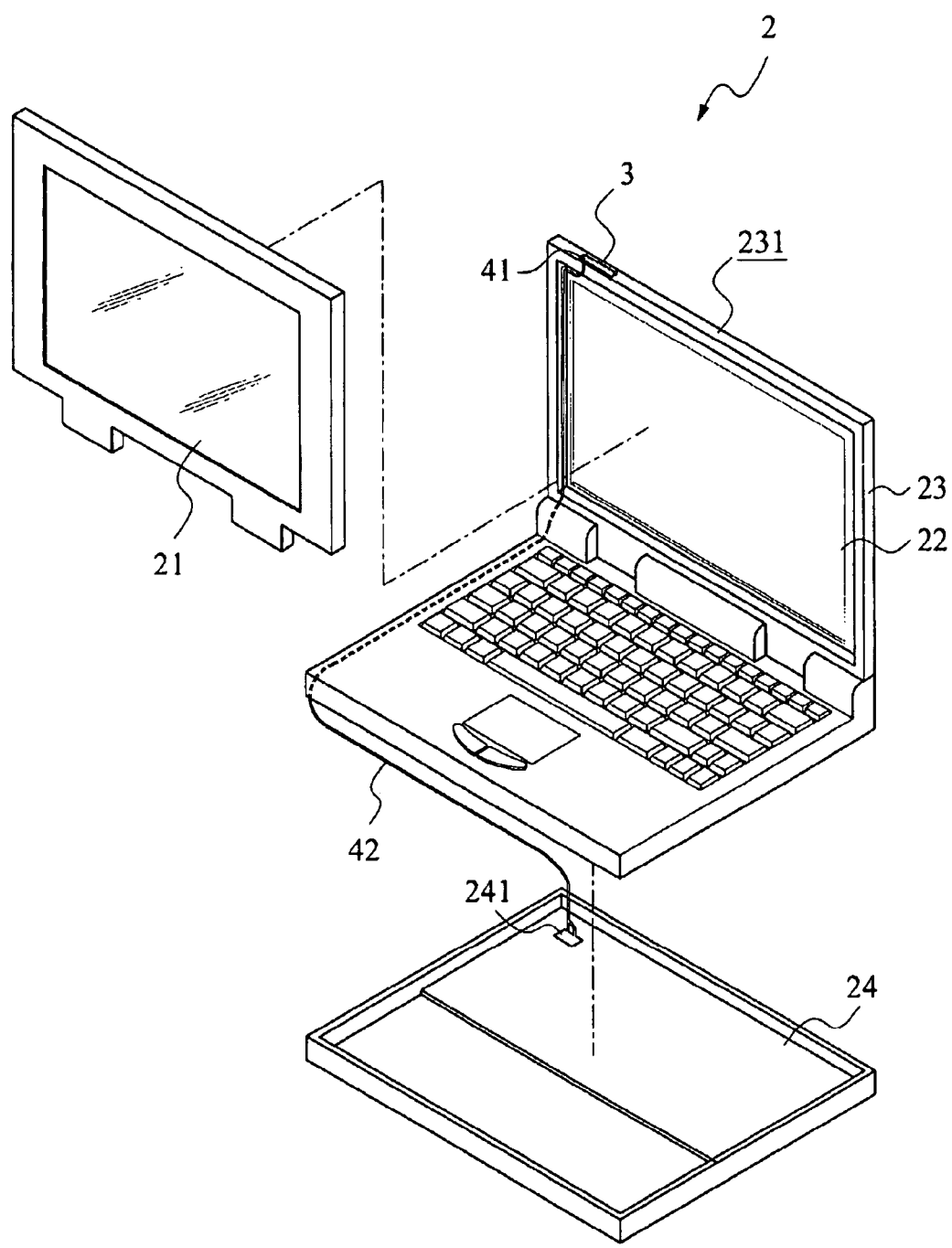
FIG. 2 is an exploded perspective view of an antenna device with an insert-molded antenna pattern in accordance with a first embodiment of the present invention.
Figure 3:
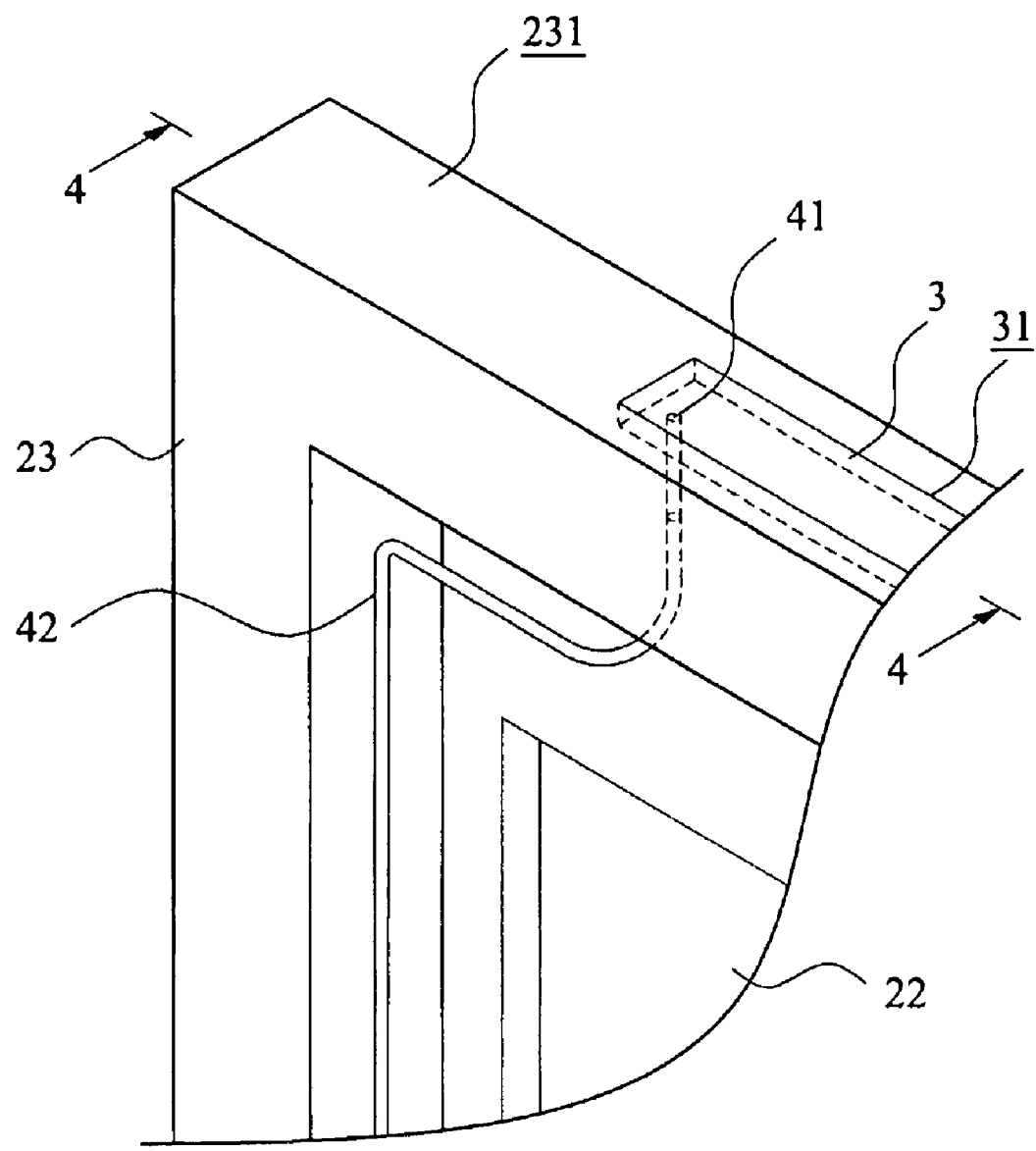
FIG. 3 is a partly enlarge view of the antenna device with an insert-molded antenna pattern in accordance with the first embodiment of the present invention.
Figure 4:
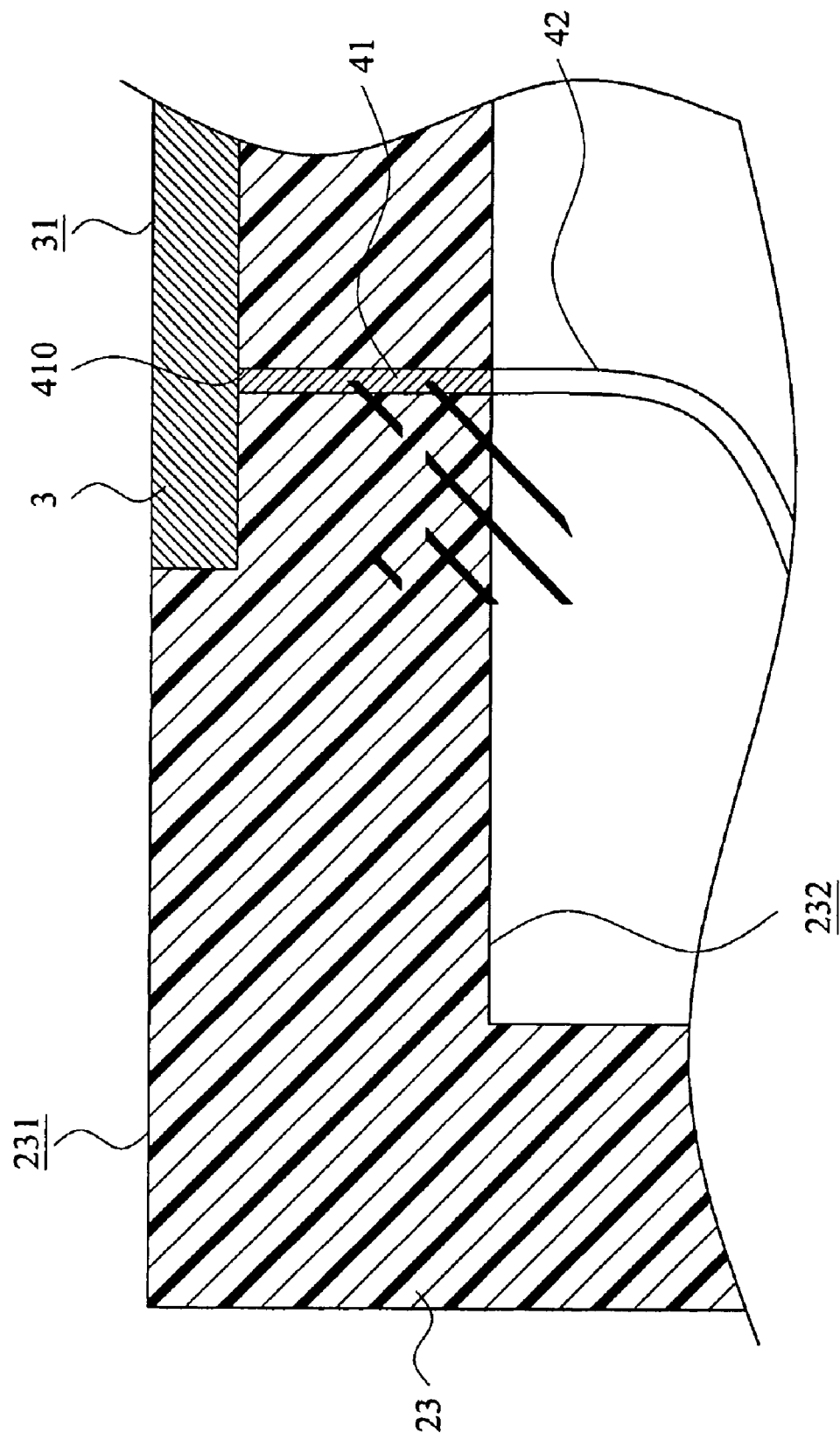
FIG. 4 is a sectional view taken along line 4-4 of FIG. 3.

With reference to the drawings and in particular to FIGS. 2 and 3 that is an exploded perspective view and a partly enlarged view, respectively, of an antenna device with an insert-molded antenna pattern in accordance with a first embodiment of the present invention, and to FIG. 4 that is a sectional view taken along line 4-4 of FIG. 2. As shown in the figures, an electronic device 2 includes an insert-molded antenna pattern 3 which is electronically connected to the electronic device 2 through a signal conducting member 41 and an antenna signal feeding line 42. Further, the insert-molded antenna pattern 3 in the first embodiment is a plate antenna, and its structure and dimension, however, are changeable in accordance with the different desired application fields.

The electronic device 2 further includes a backlight module 21, an anti-EMI plate 22 which is used to protect the electronic device 2 from possible electromagnetic interference (EMI), a substrate 23 which includes a first surface 231 and a second surface 232, and a motherboard 24 including an antenna module 241.

Besides, the insert-molded antenna pattern 3 is embedded in the first surface 231 of the substrate 23 and being connected to a first end (top end) of the signal conducting member 41, and a second end (bottom end) of the signal conducting member 41 is connected to the antenna signal feeding line 42 after the signal conducting member 41 passes through the substrate 23 and reaches the second surface 232. The signal conducting member, which includes a through hole 410 and a coating of conductive materials such as tin and lead, is to electrically connect the insert-molded antenna pattern 3 and the antenna signal feeding line 42.

The function of the signal conducting member 41 is to conduct the wireless signals transceived by the insert-molded antenna pattern 3 to the antenna module 241 of the electronic device 2 through the antenna signal feeding line 42, and also to conduct the wireless signals generated by the antenna module 241 to the insert-molded antenna pattern 3 through the same line 42. Such connection enables the transceiving and processing of wireless signals of the electronic device 2.

The insert-molded antenna pattern 3 is formed by an insert-molding process. Insert-molding is an injection molding process whereby selected plastic or thermoplastic is injected into a cavity and around an insert piece placed into the same cavity just prior to molding. The result of insert-molding is a single piece with the insert encapsulated by the plastic. The insert can be made of metal or another plastic.

When preceding the insert-molding process, an antenna pattern, such as a paste antenna, is preformed and inserted into a cavity, and then a selected plastic is injected into the cavity and around the preformed antenna pattern, so as to obtain the insert-molded antenna pattern 3. In this embodiment, the insert-molded antenna pattern 3 has a top surface 31 exposed to the first surface 231 of the substrate 23.

Figure 5:
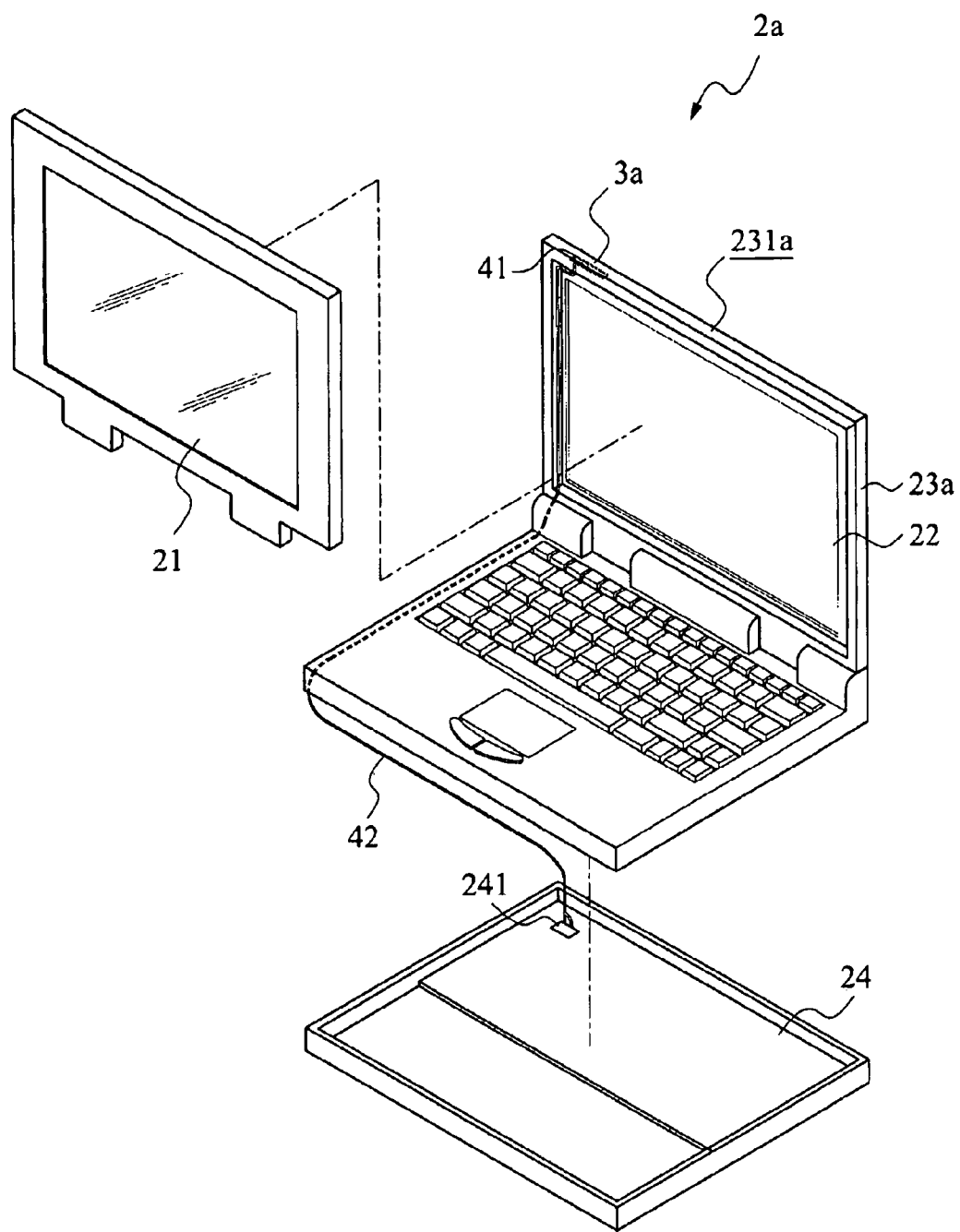
FIG. 5 is an exploded perspective view of an antenna device with an insert-molded antenna pattern in accordance with a second embodiment of the present invention.
Figure 6:
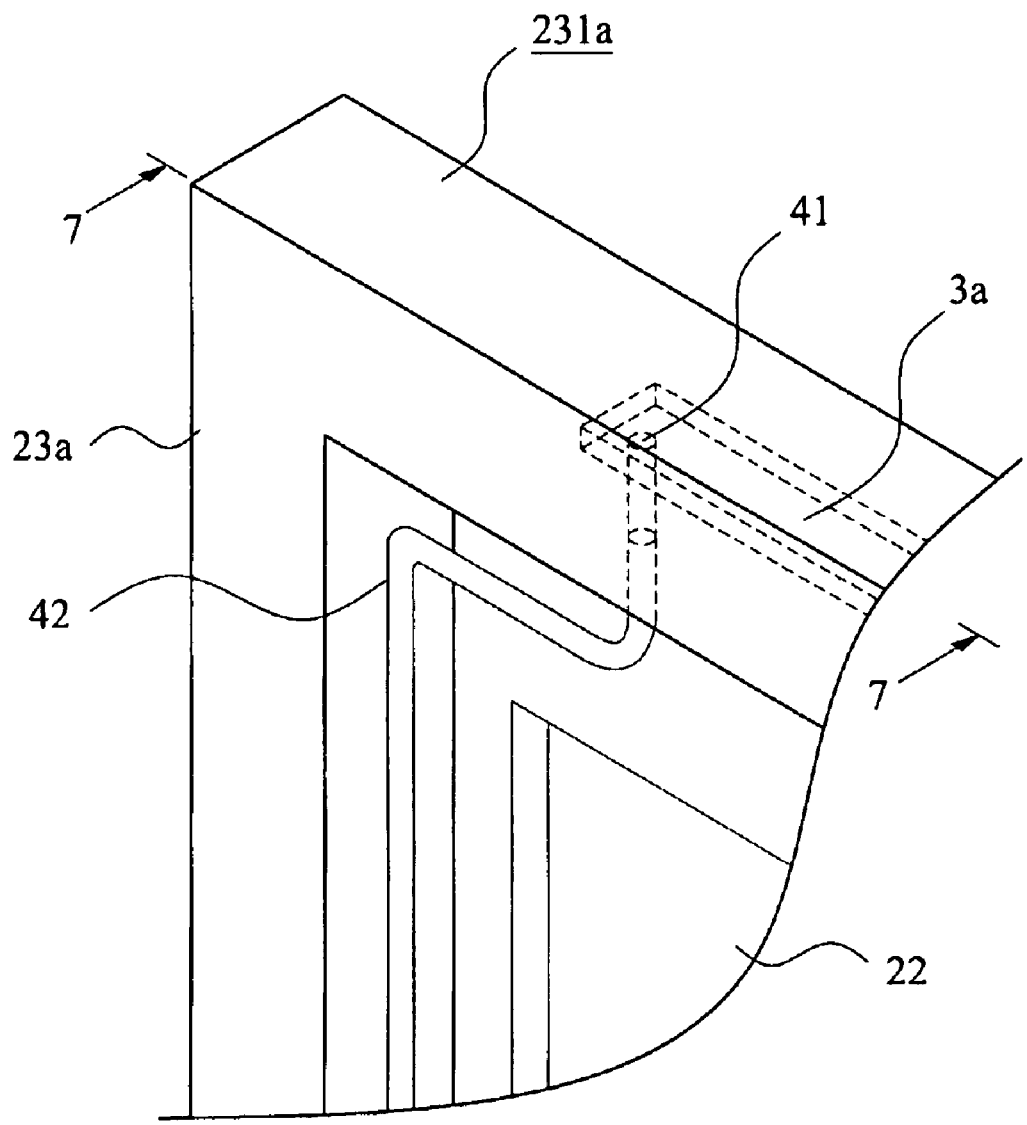
FIG. 6 is a partly enlarged view of the antenna device with an insert-molded antenna pattern in accordance with the second embodiment of the present invention.
Figure 7:
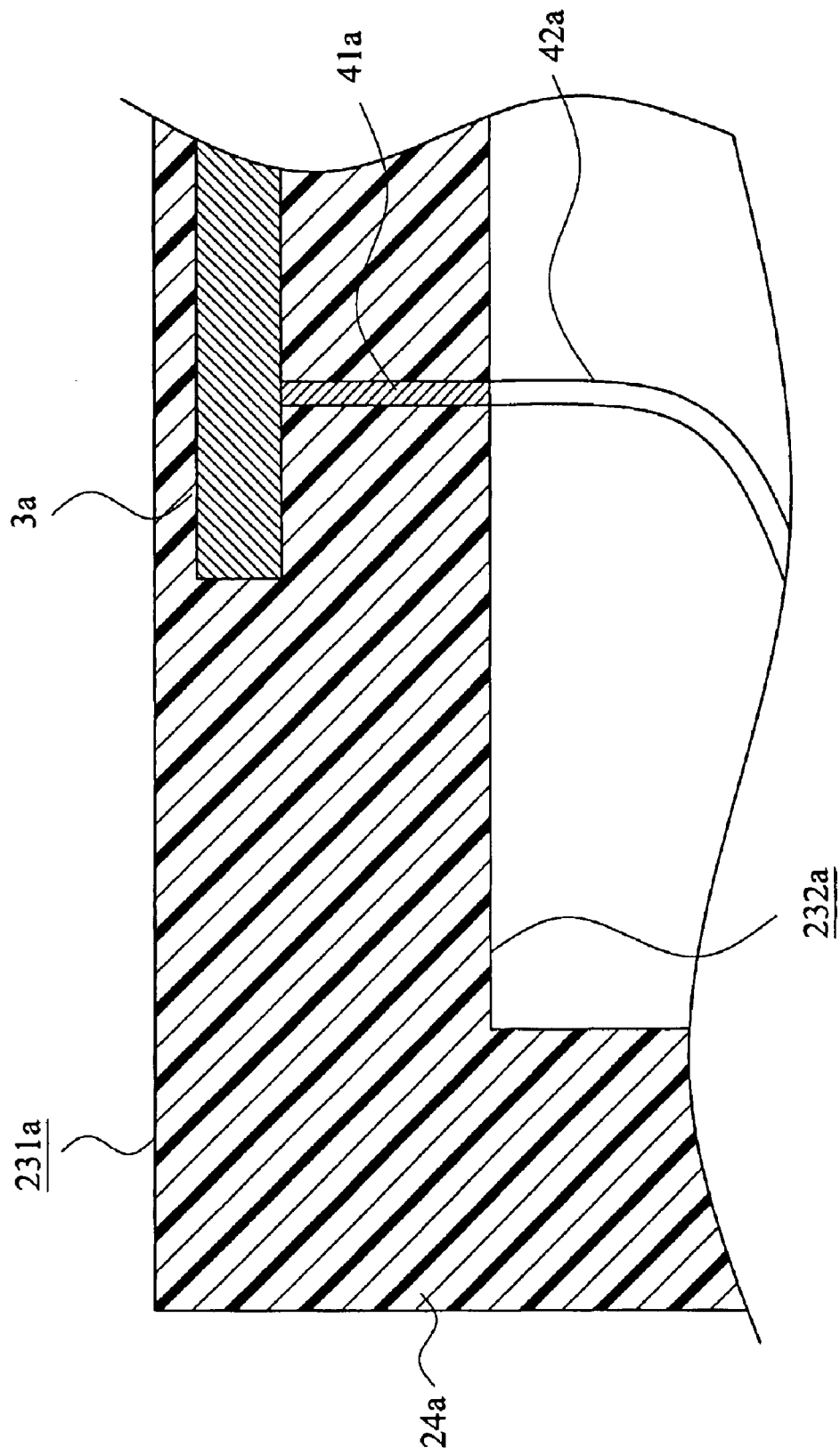
FIG. 7 is a sectional view taken along line 7-7 of FIG. 6.

Please refer to FIGS. 5 and 6, which are exploded perspective and partly enlarged views, respectively, of an antenna device with an insert-molded antenna pattern of a second embodiment of the present invention, and to FIG. 7, which is a sectional view taken along line 7-7 of FIG. 6. As shown in the figures, an electronic device 2a includes a substrate 23a with a first surface 231a and a second surface 232a. The difference of the second embodiment from the first embodiment lies in the insert-molded antenna pattern 3a embedded inside the substrate 23a and adjacent to the first surface 231a of the substrate 23a. The insert-molded antenna pattern 3a is also formed by insert-molding process.

The insert-molded antenna pattern 3a is electronically connected to the electronic device 2 through a signal conducting member 41a and an antenna signal feeding line 42a. Alternatively, the antenna signal feeding line 42a may be directly connected between the electronic device 2 and the insert-molded antenna pattern 3a.

Figure 8:
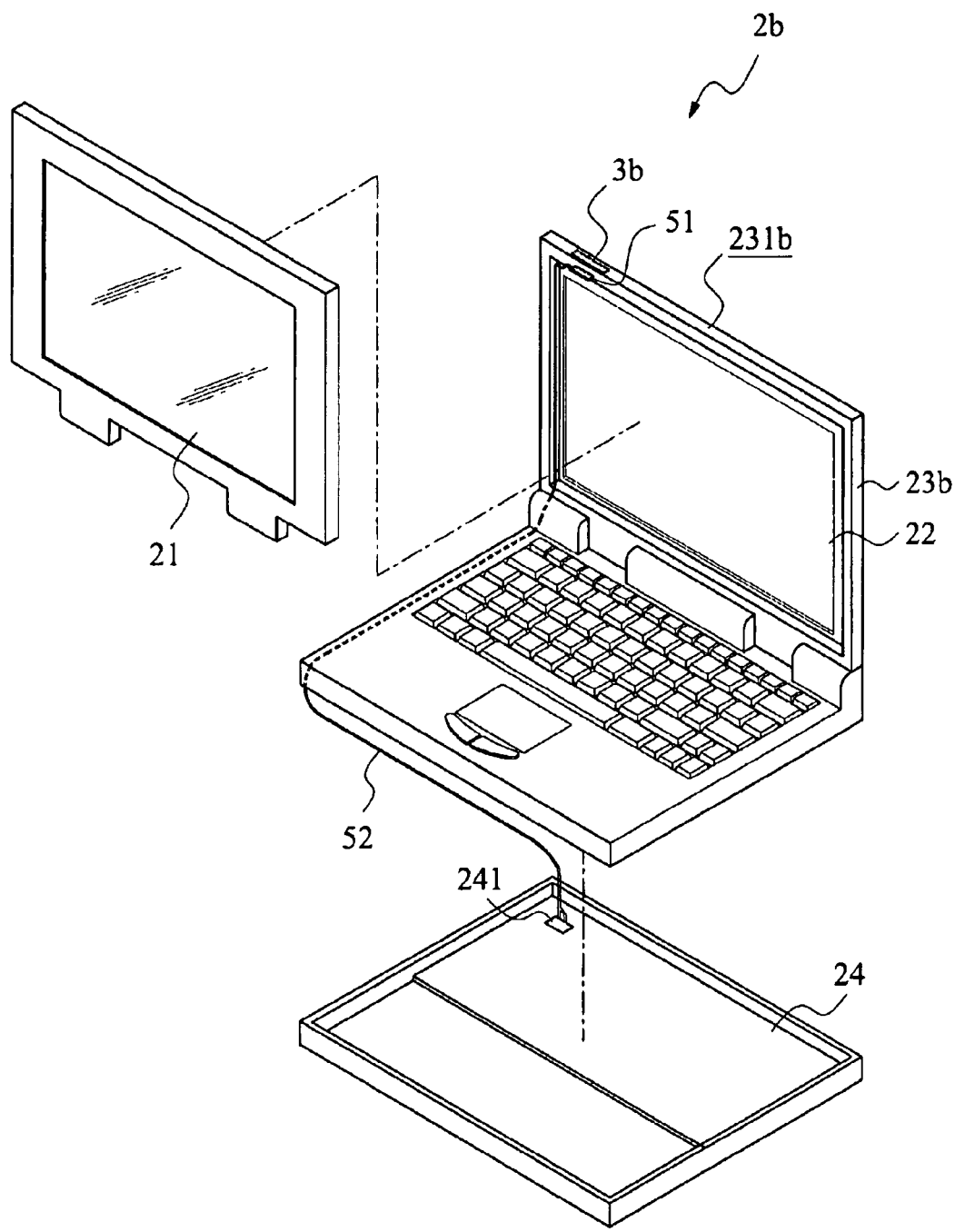
FIG. 8 is an exploded perspective view of an antenna device with an insert-molded antenna pattern in accordance with a third embodiment of the present invention.
Figure 9:
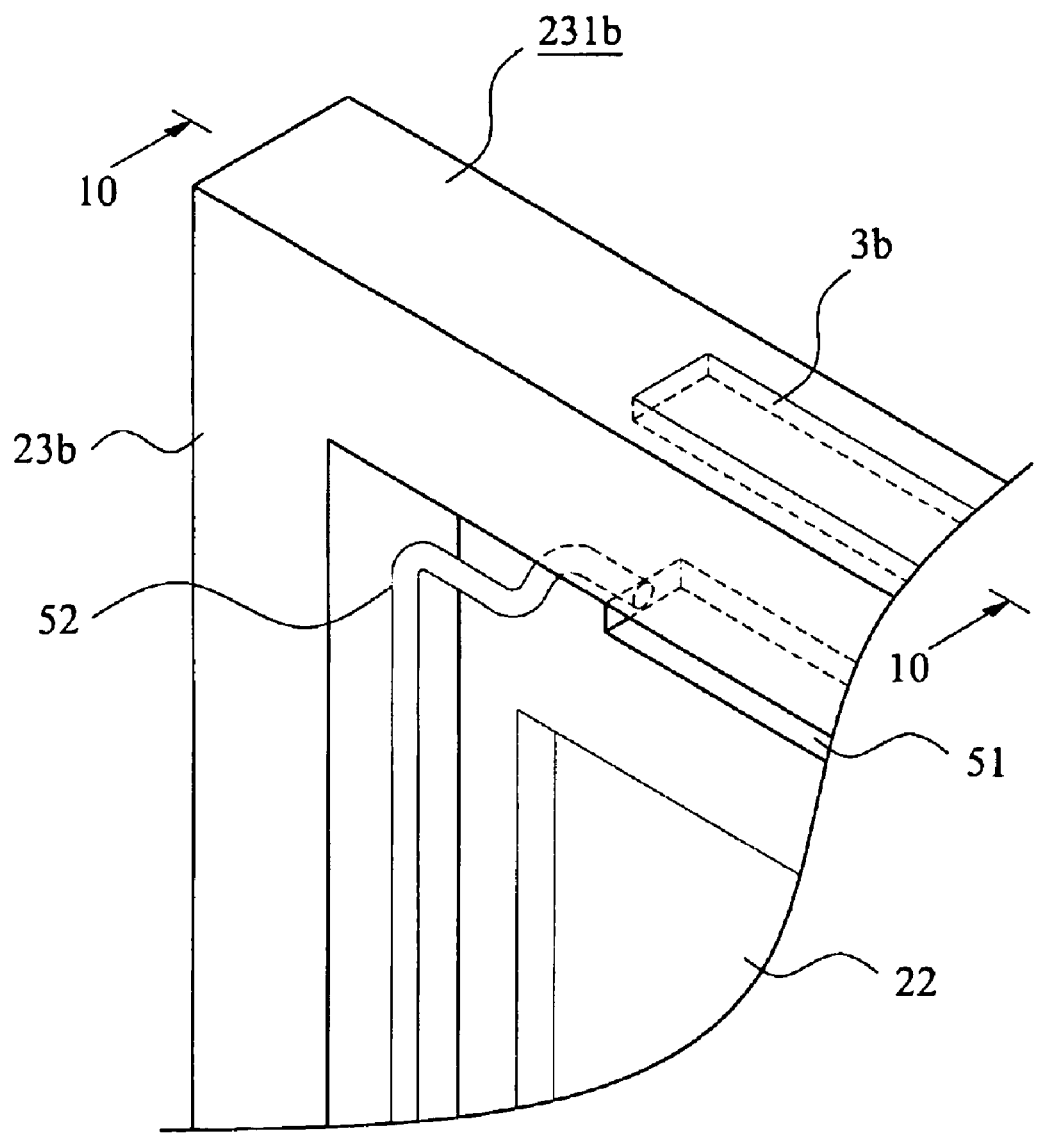
FIG. 9 is a partly enlarged view of the antenna device with an insert-molded antenna pattern in accordance with the third embodiment of the present invention.
Figure 10:
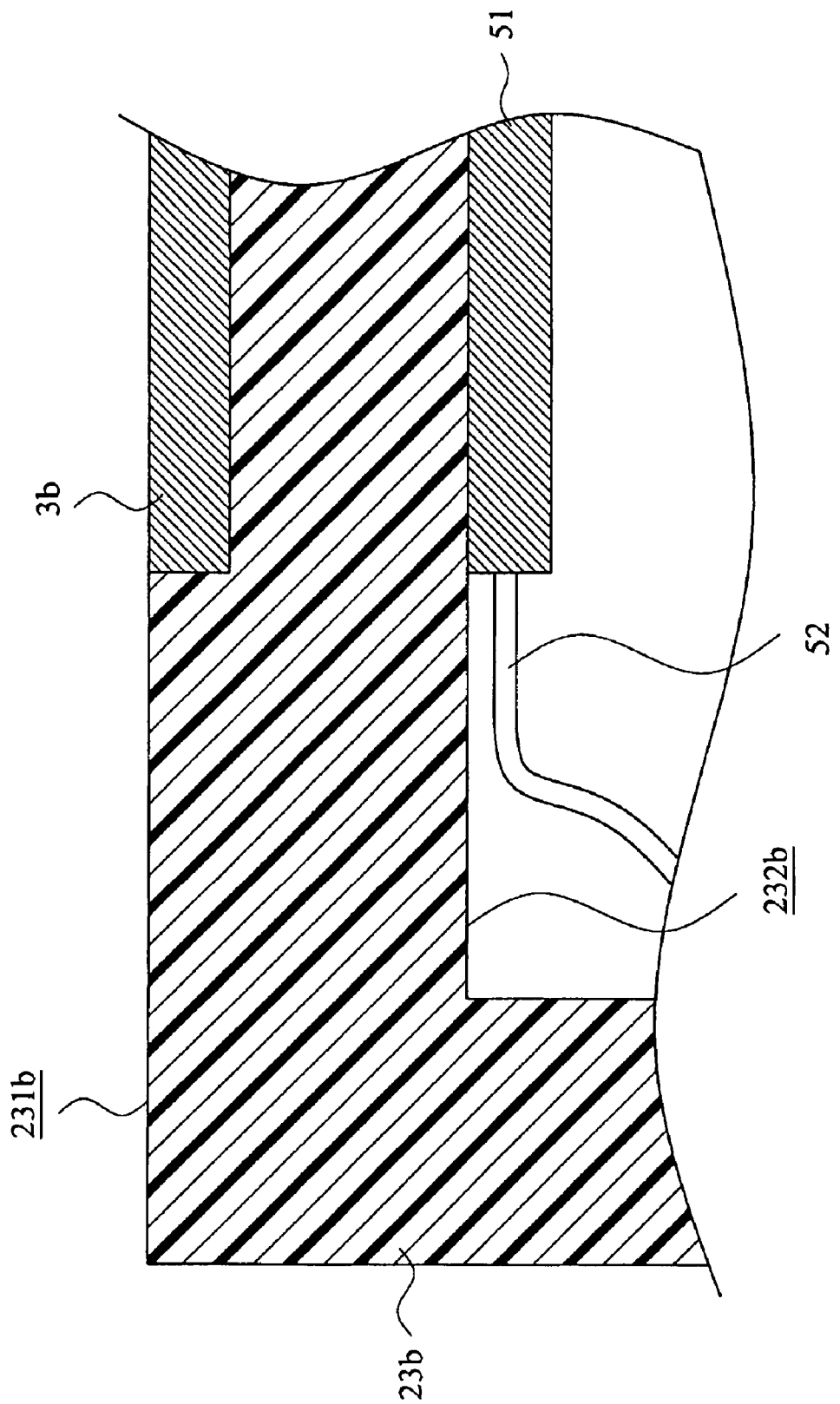
FIG. 10 is a sectional view taken along line 10-10 of FIG. 9.

As shown in the FIGS. 8 and 9, which is an exploded perspective view and a partly enlarged view, respectively, of an antenna device with an insert-molded antenna pattern in accordance with the third embodiment of the present invention, and FIG. 10, which is a sectional view taken along line 10-10 of FIG. 8, an electronic device 2b includes an insert-molded antenna pattern 3b, and the insert-molded antenna pattern 3b is coupled to the electronic device 2b through an antenna coupling element 51 and an antenna signal feeding line 52. Further, the insert-molded antenna pattern 3b is a plate antenna, and its structure and dimension, however, are changeable in accordance with the different desired application fields.

The electronic device 2b further includes an outer casing 21, an anti-EMI plate 22 which is used to protect the electronic device 2b from possible electromagnetic interference (EMI), a substrate 23b which includes a first surface 231b and a second surface 232b, and a motherboard 24 including an antenna module 241.

Besides, the insert-molded antenna pattern 3b is embedded in the first surface 231b of the substrate 23b and coupled (with no direct wire connection) by the antenna coupling element 51, which is arranged on the second surface 232b of the substrate 23b and electrically connected to the antenna module 241 of the electronic device 2b by the antenna signal feeding line 52, in order to conduct the wireless signals transceived by the insert-molded antenna pattern 3b from the antenna coupling element 51 to the antenna module 241 of the electronic device 2b through the antenna signal feeding line 52, and also to conduct the wireless signals generated by the antenna module 241 to the insert-molded antenna pattern 3b through the same line 52. Such connection enables the transceiving and processing of wireless signals of the electronic device 2b.

Figure 11:
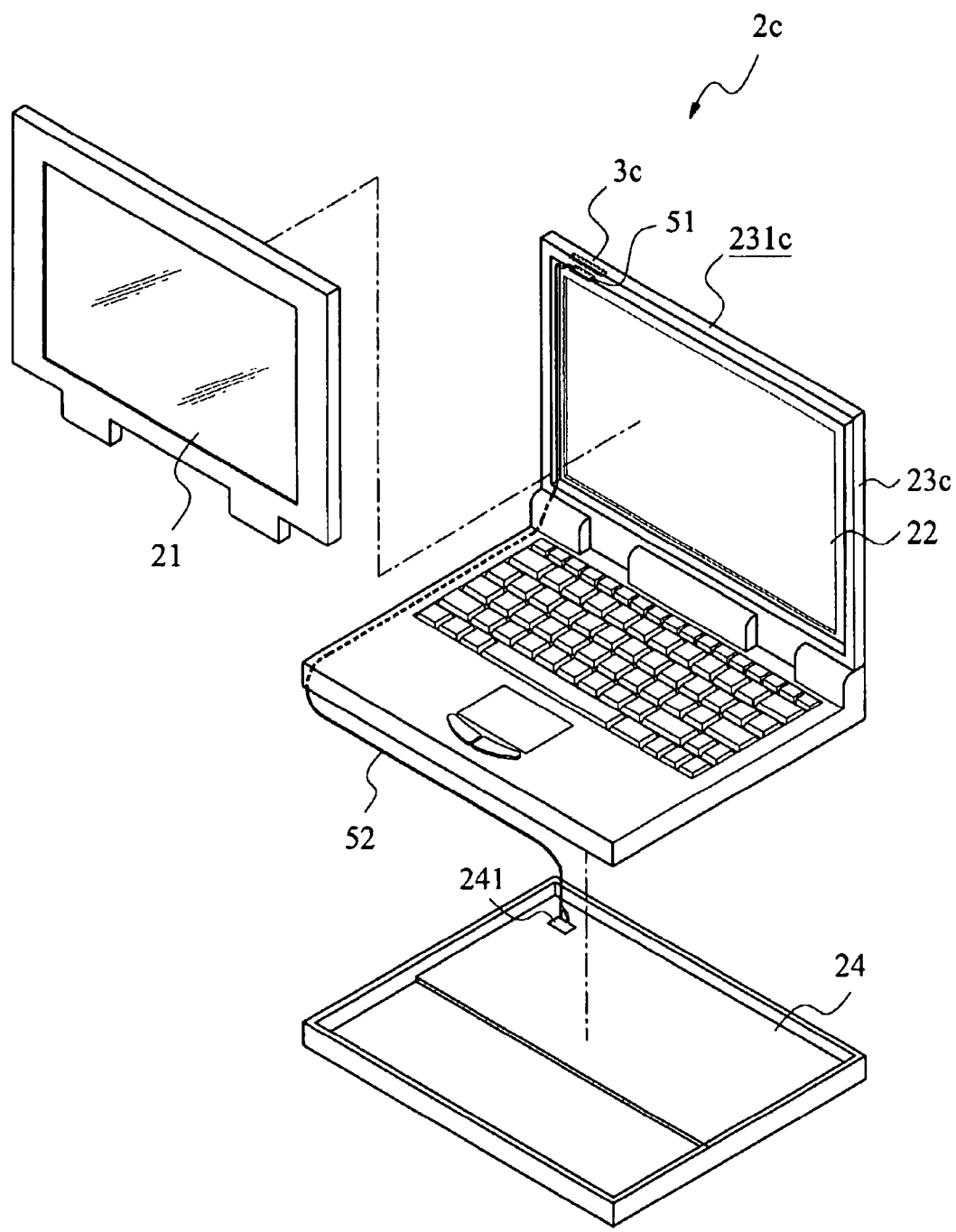
FIG. 11 is an exploded perspective view of an antenna device with an insert-molded antenna pattern in accordance with a fourth embodiment of the present invention.
Figure 12:
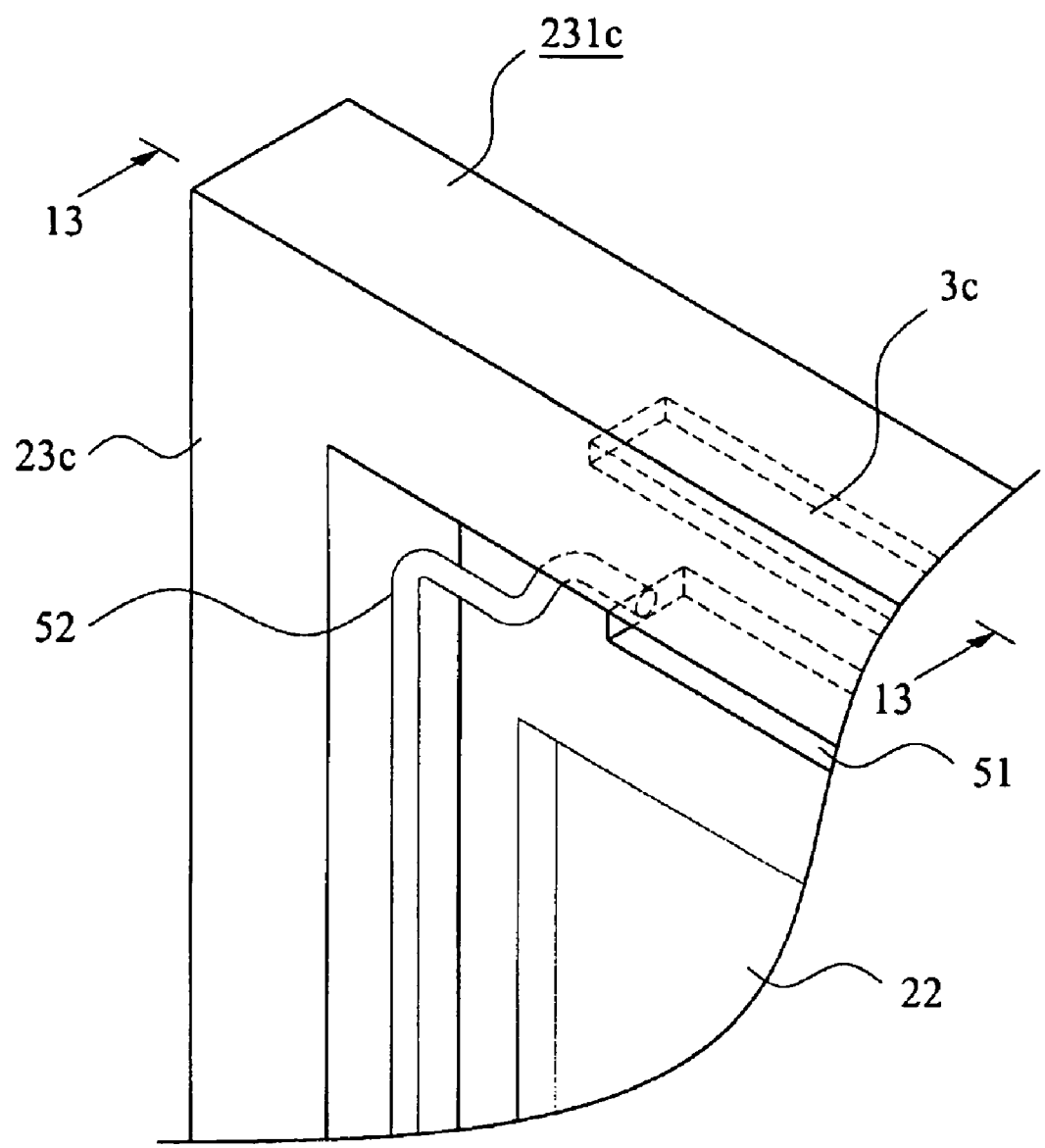
FIG. 12 is a partly enlarged view of the antenna device with an insert-molded antenna pattern in accordance with the fourth embodiment of the present invention.
Figure 13:
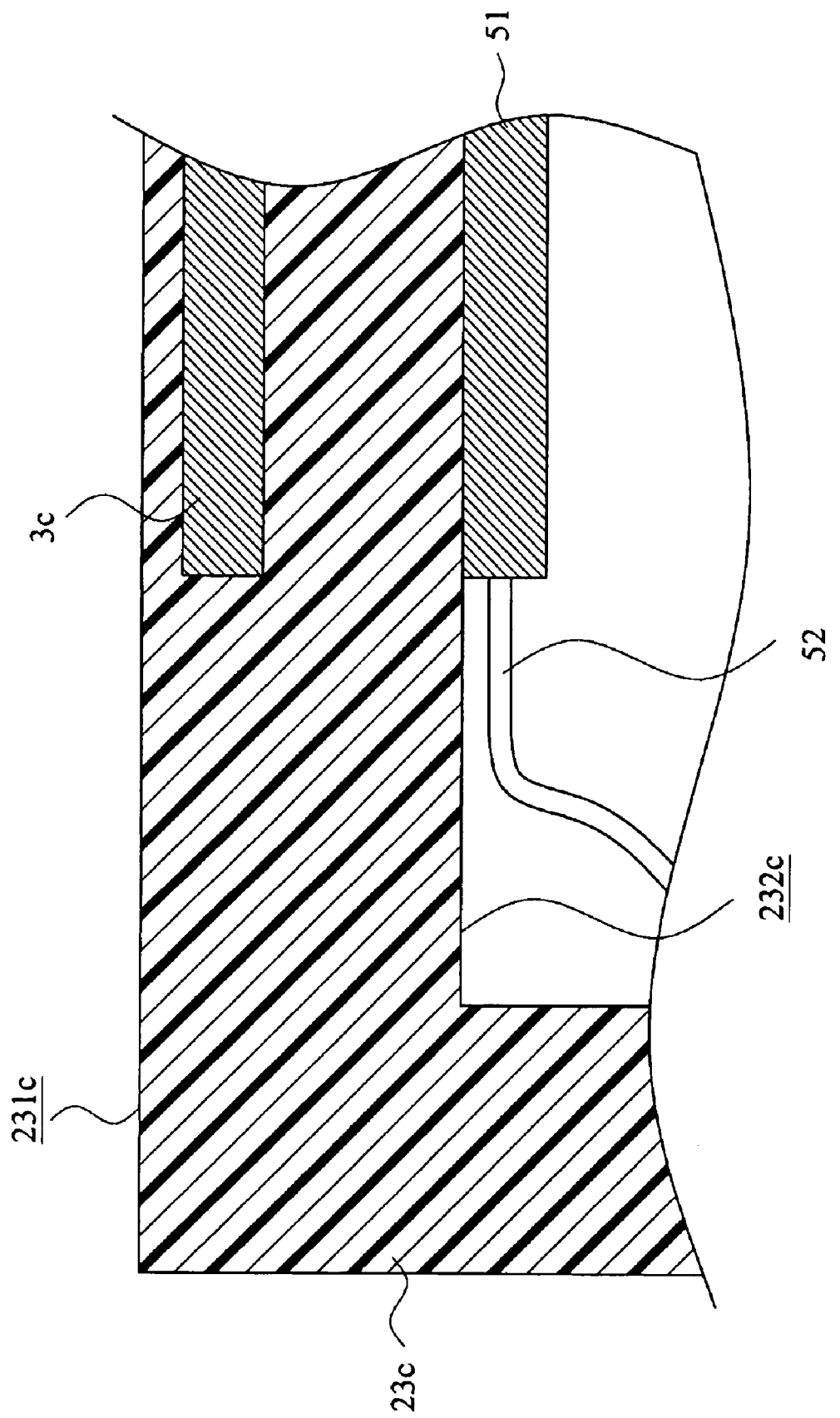
FIG. 13 is a sectional view taken along line 13-13 of FIG. 12.

Please refer to FIGS. 11 and 12, which are exploded perspective and partly enlarged views, respectively, of an antenna device with an insert-molded antenna pattern of a fourth embodiment of the present invention, and to FIG. 13, which is a sectional view taken along line 13-13 of FIG. 11. As shown in the figures, an electronic device 2c includes a substrate 23c with a first surface 231c and a second surface 232c. The difference of the fourth embodiment from the third embodiment lies in the insert-molded antenna pattern 3c forming inside the substrate 23c and adjacent to the first surface 231c of the substrate 23c.

The substrates 23, and 23a to 23d in the above embodiments of the present invention could be the casing of the electronic device or a plastic plate when applied in different fields of application.

Figure 14:
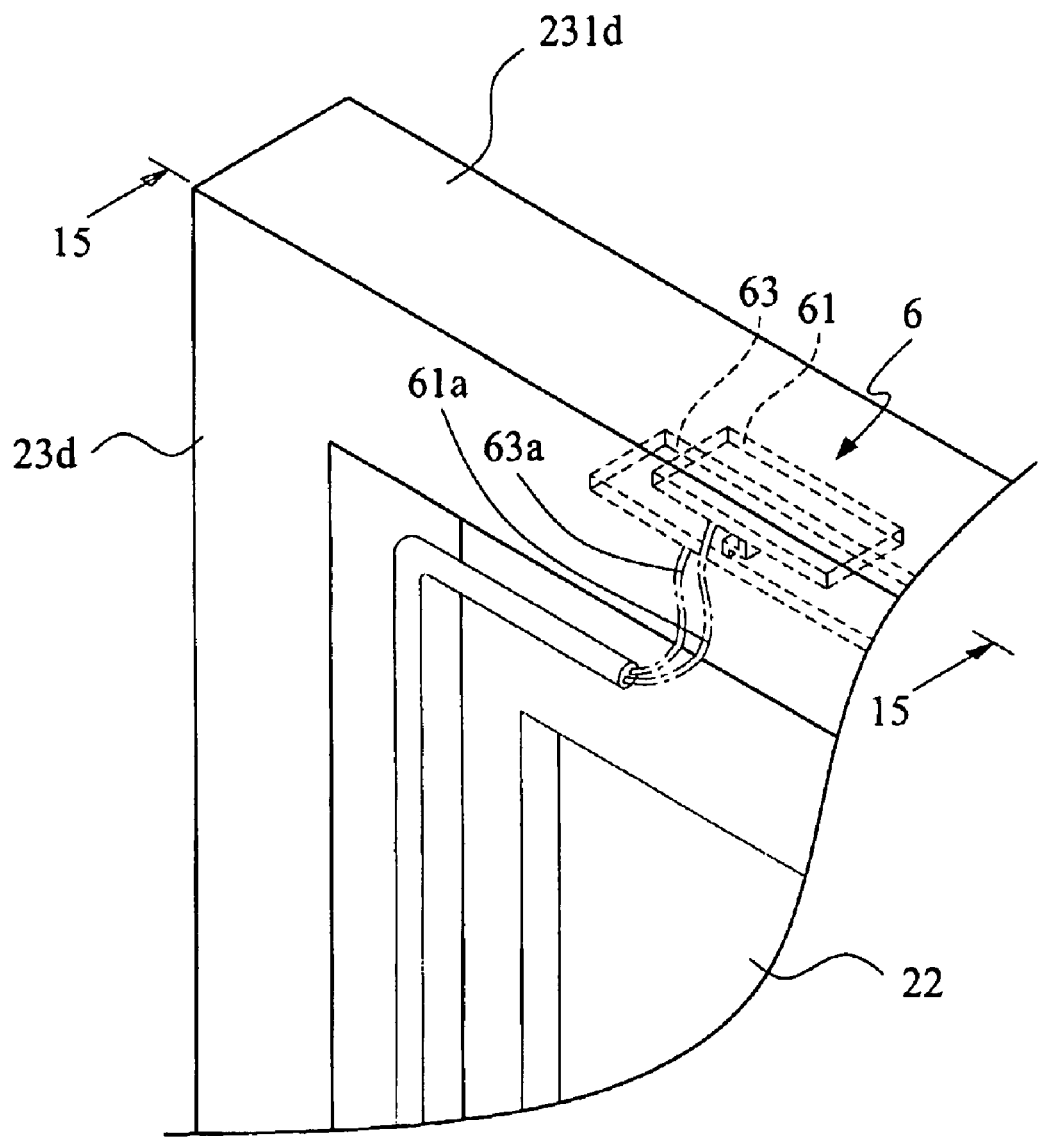
FIG. 14 is a partly enlarged view of the antenna device with an insert-molded antenna pattern in accordance with a fifth embodiment of the present invention.
Figure 15:
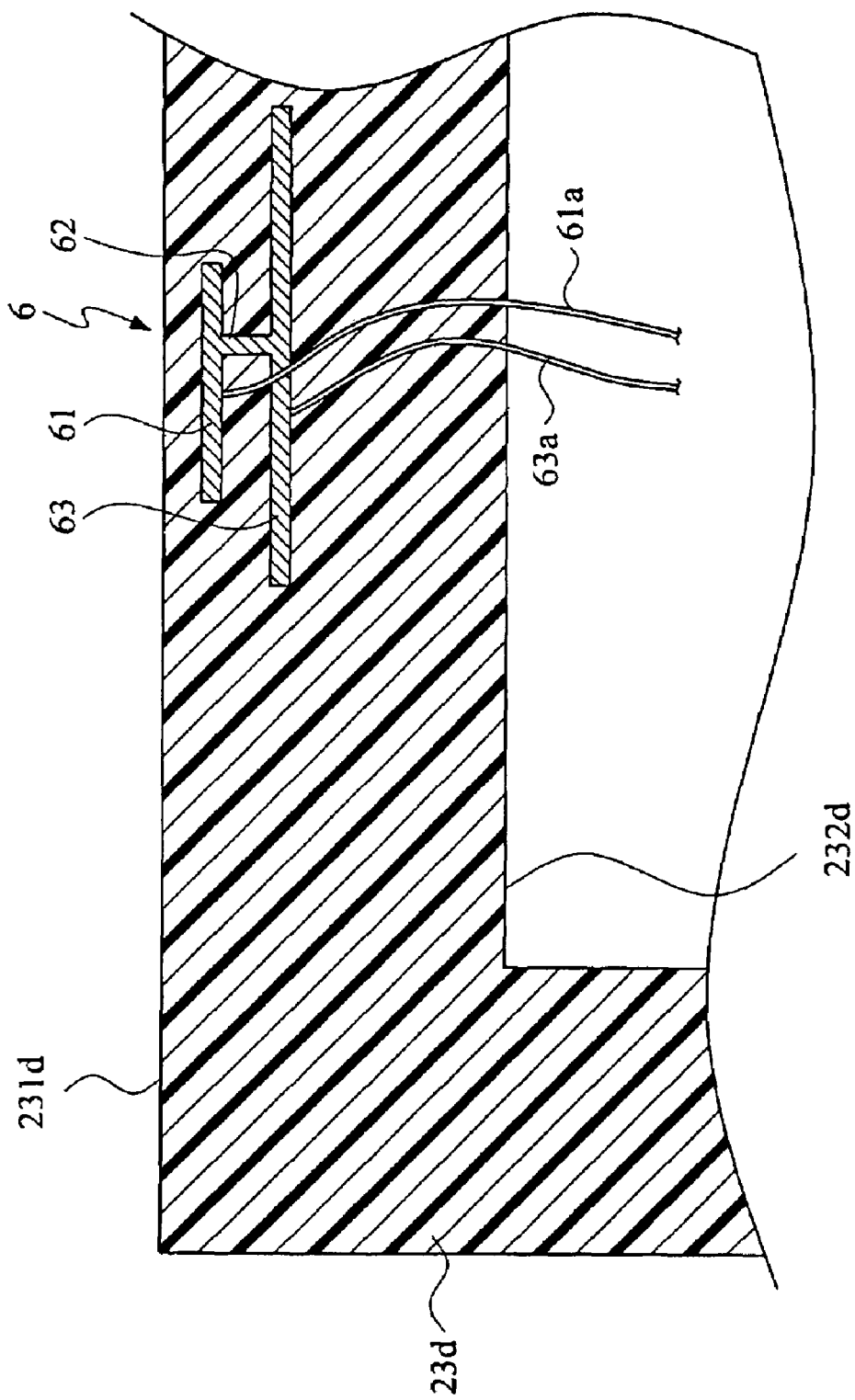
FIG. 15 is a sectional view taken along line 15-15 of FIG. 14.

FIG. 14 is a partly enlarged view of the antenna device with an insert-molded antenna pattern in accordance with a fifth embodiment of the present invention. FIG. 15 is a sectional view taken along line 15-15 of FIG. 14. In this embodiment, a planer typed antenna PIFA (Planner Inverted F Antenna) 6 is embedded in the substrate 23d having a first surface 231d and a second surface 232d. The planer typed antenna 6 is provided with a signal feeding plate 61, a connection section 62, and a ground plane 63. A signal feeding line 61a is connected to the signal feeding plate 61 and a ground line 63a is connected to the ground plane 63. The planer typed antenna 6 is embedded in the substrate 23d with the top surface of the signal feeding plate 61 adjacent to the first surface 231d of the substrate 23d. Alternatively, the planer typed antenna 6 may be embedded in the substrate 23d with the top surface of the signal feeding plate 61 exposed to the first surface 231d of the substrate 23d.

From the above statement, the present invention directly implants an antenna pattern inside the structure of an electronic device by applying the insert-molding process accompanying a direct wire connection or a coupling feeding. Further, the present invention can be adapted into a wide range of electronic devices when used in different fields of application.

While the invention has been described in connection with what is presently considered to the most practical and preferred embodiments, it is to be understood that the invention is not to be limited to the disclosed embodiments, but on the contrary, is intended to cover various modifications and equivalent arrangement included within the spirit and scope of the appended claims.

What is claimed is:

1. An antenna device, comprising:
   a substrate having a first surface and a second surface;
   an insert-molded antenna pattern embedded in the substrate and formed by an insert-molding process for transceiving a wireless signal of a predetermined radiation frequency, wherein the substrate comprises at least one through hole communicating the second surface and a bottom surface of the insert-molded antenna pattern;
   a signal conducting member with a first end connecting to the insert-molded antenna pattern and a second end extended to the second surface of the substrate, wherein the signal conducting member comprises a coating of conductive material coated on an interior wall of the through hole; and
   an antenna signal feeding line connecting to the signal conducting member for feeding the wireless signal transceived by the insert-molded antenna pattern through the signal conducting member, wherein the insert-molded antenna pattern is electrically connected to an antenna module of an electronic device through the signal conducting member and the antenna signal feeding line.

2. The antenna device as claimed in claim 1, wherein the insert-molded antenna pattern has a top surface exposed to the first surface of the substrate.

3. The antenna device as claimed in claim 1, wherein the insert-molded antenna pattern has a top surface adjacent to the first surface of the substrate.

4. The antenna device as claimed in claim 2, wherein the through hole communicates the first surface and the second surface of the substrate.

5. The antenna device as claimed in claim 1, wherein the substrate is made of plastic material.

6. The antenna device as claimed in claim 1, wherein the substrate is a casing of an electronic device.

* * * * *